No. 685,219. Patented Oct. 22, 1901.
H. R. PATRIARCHE.
CUSHION.
(Application filed Aug. 10, 1900.)
(No Model.) 2 Sheets—Sheet 1.
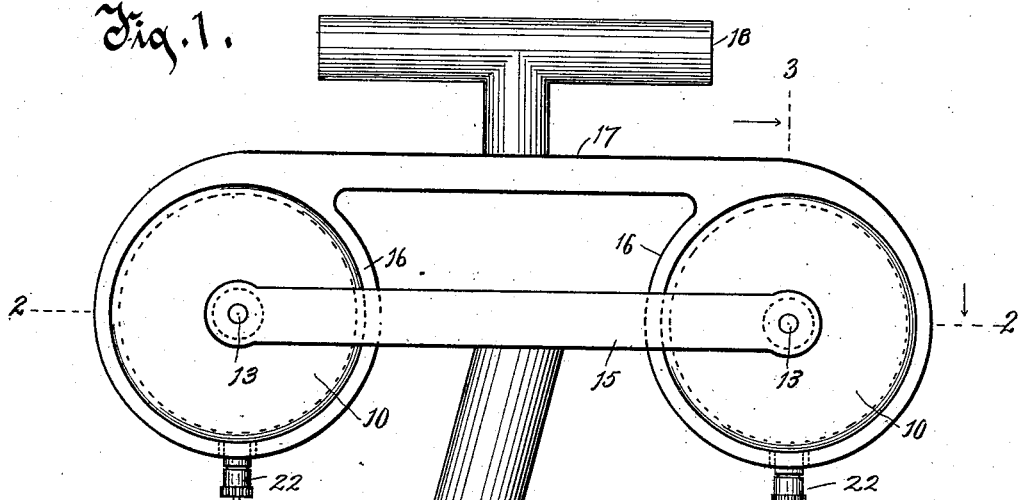
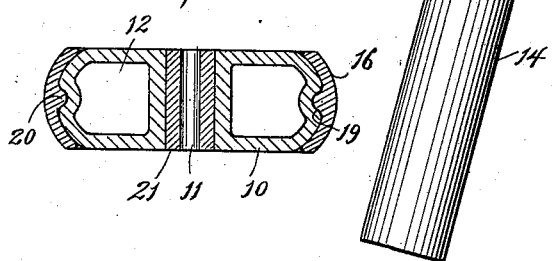
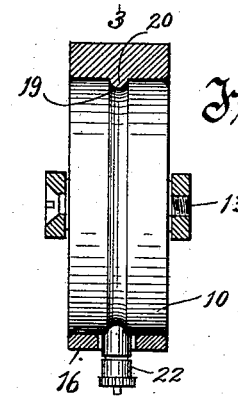
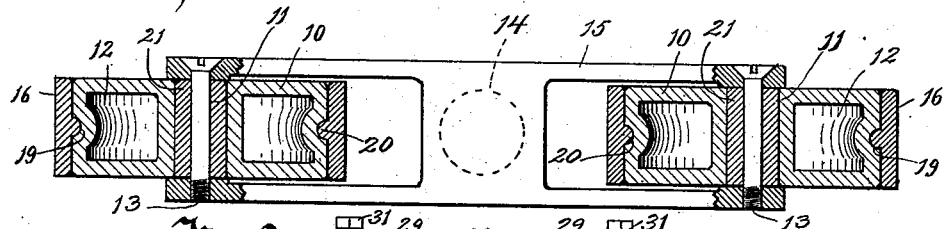
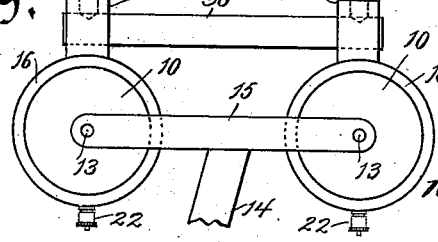
Witnesses. Inventor.
Hugh R. Patriarche
By Benedict & Morsell
Attorneys.

No. 685,219. Patented Oct. 22, 1901.
H. R. PATRIARCHE.
CUSHION.
(Application filed Aug. 10, 1900.)
(No Model.) 2 Sheets—Sheet 2.
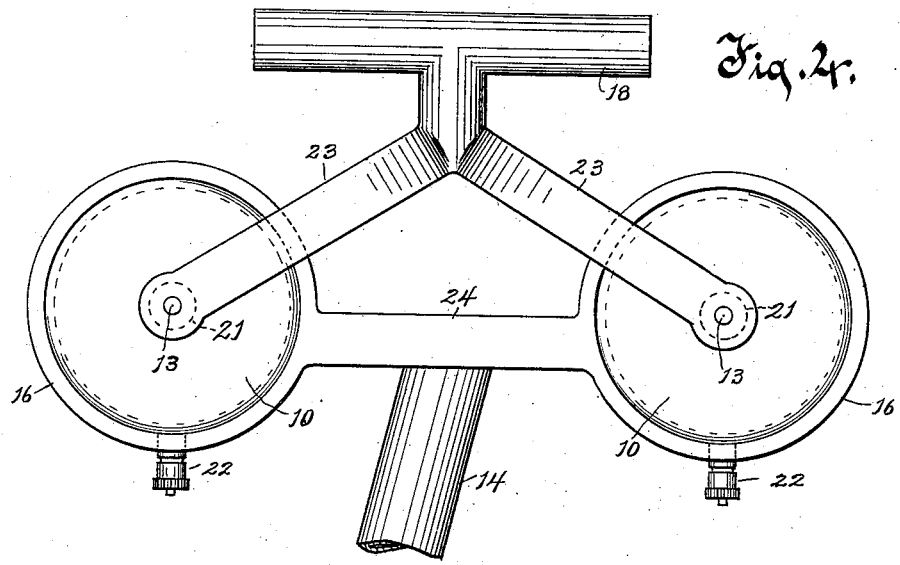
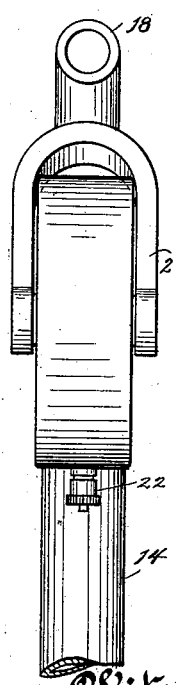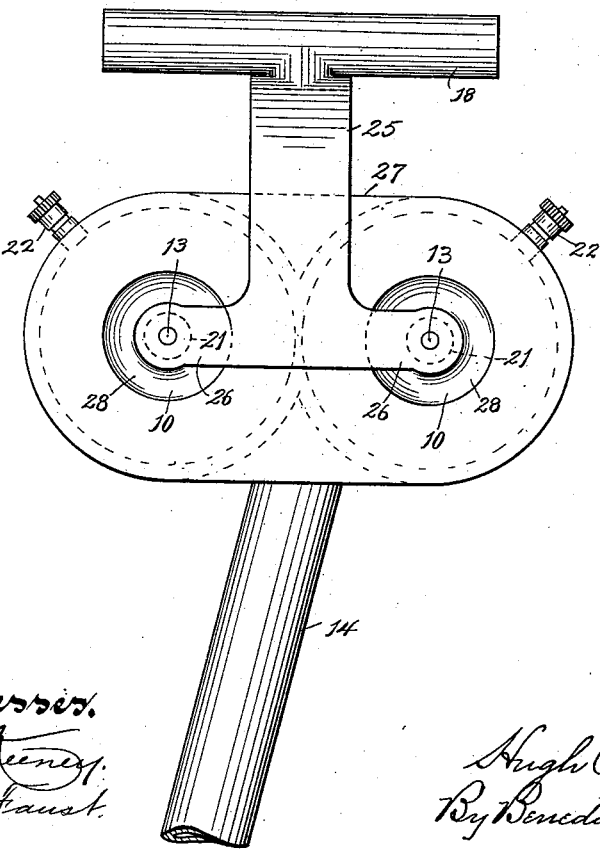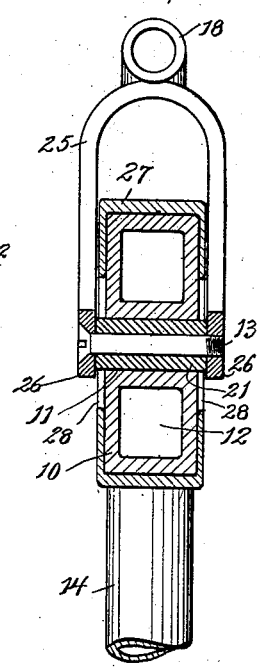

UNITED STATES PATENT OFFICE.

HUGH R. PATRIARCHE, OF MILWAUKEE, WISCONSIN, ASSIGNOR OF ONE-HALF TO HARRY DEAN, OF DETROIT, MICHIGAN.

CUSHION.

SPECIFICATION forming part of Letters Patent No. 685,219, dated October 22, 1901.

Application filed August 10, 1900. Serial No. 26,473. (No model.)

*To all whom it may concern:*

Be it known that I, HUGH R. PATRIARCHE, of Milwaukee, in the county of Milwaukee and State of Wisconsin, have invented new and useful Improvements in Cushions, of which the following is a description, reference being had to the accompanying drawings, which are a part of this specification.

My invention has relation to improvements in cushions.

The invention may be used to particular advantage as a yielding support for a bicycle saddle or seat, although its application is not intended to be restricted to this particular adaptation, as the device may be employed as a support for a seat of any form of vehicle, or, again, it can be employed for the purpose of securing a cushioning effect at any desirable point of any other form of mechanism.

The primary object of the invention is to provide an improved form of cushion which shall be so constructed and arranged that a cushioning effect will be secured in any direction in which force may be directed.

With the above primary object in view the invention consists of the devices and parts or their equivalents, as hereinafter set forth.

In the present illustration of the invention I have shown it in connection with the seat-post of an ordinary bicycle-frame and adapted to act as a yielding support for the bicycle saddle or seat.

In the drawings, Figure 1 is a side elevation of the device as properly arranged at the upper end of a bicycle seat-post. Fig. 2 is a horizontal section on the line 2 2 of Fig. 1. Fig. 3 is a section on the line 3 3 of Fig. 1, the cushion being shown in full. Fig. 4 is a side elevation of a modified form of construction. Fig. 5 is an end elevation of Fig. 4. Fig. 6 is a side elevation of another modified form of construction. Fig. 7 is a transverse section of Fig. 6, taken on a plane through one of the cushions. Fig. 8 is a sectional view of a slightly-modified form of air-cushion and the casing therefor, and Fig. 9 is a side elevation of still another modified form of construction.

The broad feature of my invention is the provision of a cushion, (indicated by the numeral 10 throughout the several figures of the drawings,) said cushion having an opening 11 and preferably a surrounding internal preferably inflatable chamber 12, the said opening 11 being for the accommodation of an axial pin 13, which pin acts as the connecting means for the supporting medium. This broad feature is common to all the several forms of construction illustrated, and by the provision thereof I am enabled to provide a cushion which is capable of yielding in all directions.

As stated at the outset of the specification, the accompanying illustration shows the invention as applied to a bicycle and at the upper end of the bicycle seat-post, so as to act as a yielding support for the seat.

The numeral 14 indicates the bicycle seat-post. In the form of construction illustrated in Figs. 1 to 3 the post is shown as provided at its upper end with a transverse plate 15, said plate having its opposite ends bifurcated, as most clearly shown in Fig. 2. Between the arms of each furcate extremity the pneumatic cushions 10 are arranged, said cushions being supported on the axial pins 13, which pins extend through the openings 11 of the cushions and have their ends secured in the arms of the bifurcated ends of the plate 15. The cushions are surrounded by retaining casings or jackets 16, said jackets being connected by a connecting strap or bar 17. This connecting strap or bar in the Fig. 1 form of construction connects the jackets at upper points thereof and serves as a support for the tube 18, to which the seat or saddle is connected, said tube being carried by an upper portion of the seat-post separate from the main portion 14 of said seat-post and depending from the tube 18. Each cushion has preferably provided therearound a groove 19, which receives a bead 20, formed on the inner side of the jacket or casing. These interlocking grooves and beads serve to prevent sidewise displacement of the cushions. In order that the axial pins 13 may not contact directly with the pneumatic cushions, I place in the openings 11 of each cushion a bushing 21, through which the axial pin passes. For the purpose of inflating the cushions I provide the same with ordinary valve mechanism 22, to which may be connected a common form of bicycle air-pump.

In Figs. 4 and 5 of the drawings the separate section of the seat-tube, which depends from the tube 18, has extending downwardly therefrom in opposite directions and at inclines yokes 23 23. The arms of these yokes straddle the pneumatic cushions and serve as bearings for the axial pins 13 instead of the ends of said pins being carried in the furcate arms of a plate, such as 15, at the upper end of the seat-post, as in the Figs. 1 to 3 form of construction. The two casings or jackets 16 in this Figs. 4 and 5 form are connected by a transverse bar 24 at the upper end of the seat-post.

In the modified construction shown in Figs. 6 and 7 the separate section of the seat-tube, which depends from the tube 18, is in the form of a yoke, and the lower end of said yoke is provided with arms 26 26, which straddle the cushions. The ends of these arms form the bearings for the axial pins 13. In this form of construction I also show the casings provided with side pieces, as indicated by the numeral 27, said side pieces extending to and merging into each other, and thereby serving to connect the casings and also serving as a means for securely retaining the cushions in place. These side pieces are provided with opposite openings 28, which allow for the movement in any direction of the axial pins when force is directed against the cushions.

Fig. 8 shows a slightly-modified form of cushion and jacket, wherein the periphery of the cushion instead of being a plain flat surface in cross-section is rounded slightly, and the encircling jacket is correspondingly rounded.

In the Fig. 9 construction the upper end of the seat-post is provided with the transverse plate 15, the same as in the Figs. 1 to 3 form of construction, and which plate forms bearings for the axial pins 13. The construction otherwise, however, is different from the Figs. 1 to 3 form in that from upper points of the periphery of the jacket extend lugs 29 29, which lugs are provided with alined openings. In these openings a bar or tube 30 is fitted, being adjustably held therein by means of set-screws 31 31. Upon this tube 30 the seat or saddle is supported.

What I claim as my invention is—

1. The combination with a plurality of cushions each provided with an opening therethrough, of a pin extending through the opening of each cushion, the said pins being connected, and the connecting medium in turn connected to the machine or device in connection with which the cushions are employed, and casings surrounding the cushions and connected together, the said casings having open sides, whereby the cushions are adapted to yield to pressure applied either upwardly or downwardly, or forwardly or rearwardly.

2. The combination of a post, a frame arranged at the upper end of the post, said frame formed or provided with casings or jackets, cushions arranged within the casings, each of said cushions provided with an opening, and pins extending through the openings of the casings and connected together, said pins forming supports for a seat or saddle.

3. In a bicycle, the combination with a saddle-post, the upper end thereof which carries the saddle being separate from the remaining portion of the post, casings connected together and supported by one of the post-sections, said casings provided with open sides, cushions arranged within the casings, each of said cushions provided with an opening therethrough, and pins extending through the openings of the casing and connected together, and the connecting medium in turn connected with one of the post-sections.

In testimony whereof I affix my signature in presence of two witnesses.

HUGH R. PATRIARCHE.

Witnesses:
A. L. MORSELL,
ANNA V. FAUST.